United States Patent [19]

Nicholson et al.

[11] Patent Number: 4,957,821

[45] Date of Patent: Sep. 18, 1990

[54] COMPOSITE ALUMINUM MOLYDENUM SHEET

[75] Inventors: Richard D. Nicholson, Chardon; Sandeep Jain, Mentor, both of Ohio

[73] Assignee: AMAX Inc., New York, N.Y.

[21] Appl. No.: 357,836

[22] Filed: May 30, 1989

[51] Int. Cl.⁵ .............................. B32B 15/01
[52] U.S. Cl. ................................. 428/651
[58] Field of Search ...................... 428/651, 663

[56] References Cited

U.S. PATENT DOCUMENTS

| | | |
|---|---|---|
| 2,682,101 | 6/1954 | Whitfield et al. ............... 428/651 |
| 2,772,985 | 12/1956 | Wainer .......................... 428/651 |
| 2,788,289 | 4/1957 | Deuble .......................... 428/651 |
| 2,788,290 | 4/1957 | Deuble .......................... 428/651 |
| 2,857,297 | 10/1958 | Moore et al. .................... 428/663 |
| 2,861,327 | 11/1958 | Bechtold et al. ................. 428/663 |
| 3,044,156 | 7/1962 | Whitfield et al. ................ 428/651 |
| 3,620,692 | 11/1971 | Franklin et al. ................. 428/651 |
| 3,930,899 | 1/1976 | Sakamaki et al. ................. 428/651 |
| 4,025,997 | 5/1977 | Gernitis et al. ................. 428/621 |
| 4,082,907 | 4/1978 | Schardein et al. ................ 428/651 |
| 4,382,977 | 5/1983 | Murphy et al. ................... 428/651 |
| 4,612,257 | 9/1986 | Broadbent ....................... 428/651 |

Primary Examiner—Theodore Morris
Assistant Examiner—David W. Schumaker
Attorney, Agent, or Firm—Michael A. Ciomek; Eugene J. Kalil

[57] ABSTRACT

Aluminum-molybdenum composite sheet is produced by assembling aluminum and molybdenum sheets to form a billet, rolling the assembled billet in a protective atmosphere at a temperature of about 100 to 400° C. to affect a reduction in thickness of at least about 40% to provide a bonded billet. The billet can be further reduced by hot and/or cold rolling.

4 Claims, 1 Drawing Sheet

COMPOSITE ALUMINUM MOLYDENUM SHEET

The invention is directed to composite materials in sheet form wherein aluminum and molybdenum are bonded together in layers.

BACKGROUND OF THE INVENTION

It has long been known that unique combinations of properties can be obtained in many articles by producing such articles as composite materials, so as to utilize desirable properties contributed by dissimilar materials incorporated in the composite structure. Examples which quickly come to mind include glass-fiber reinforced plastic articles widely used in marine and aviation applications such as boats, carbon fiber reinforced articles such as golf club shafts and many other articles, composite copper-cored coins such as the United States dime, quarter, etc. It has been recognized that special combinations of properties can be provided by the composite route which are not possible in a single material.

Inevitably, the demand for highly specialized combinations of properties in materials becomes more acute as the requirements imposed by increased sophistication in industry become more severe. For example, the electronics industry has been subject to increased demands for materials in miniaturization of equipment coupled with higher power and the generation of more heat in smaller packages has proceeded.

It is recognized that aluminum is a metal characterized by high conductivity for heat and electricity which suffers drawbacks in terms of desired strength for many applications. Aluminum is relatively soft and malleable and is readily workable. Molybdenum is a metal characterized by high melting point, 2610° C., whereas aluminum melts at 660° C. Molybdenum is strong and retains its strength at elevated temperatures, e.g., 1000° C. Forging temperatures for molybdenum are said to be generally between 1180° and 1290° C., a temperature range exceeding the melting point of aluminum.

A review of the differences in properties and characteristics between molybdenum and aluminum would lead one skilled in the art to believe that molybdenum and aluminum could not be combined in a composite structure due to the great disparity in properties between the two metals. Such a composite has heretofore been unknown.

The present invention is based on the discovery of a method for producing composite sheet of aluminum and molybdenum.

BRIEF STATEMENT OF THE INVENTION

The invention comtemplates producing composite molybdenum-aluminum sheet by assembling at least one plate of molybdenum with at least one plate of aluminum to form a composite billet, heating the resulting composite billet in a protective atmosphere to a temperature within the hot working temperature range for aluminum, working said billet in a protective atmosphere to effect a reduction in thickness thereof of at least about 40% to bond said aluminum and said molybdenum together and thereafter further reducing the thickness of the bonded billet by hot and/or cold working to produce composite sheets of sandwich configuration with either aluminum or molybdenum in the center.

In the drawing

DETAILED DESCRIPTION OF THE INVENTION

Figure 1:
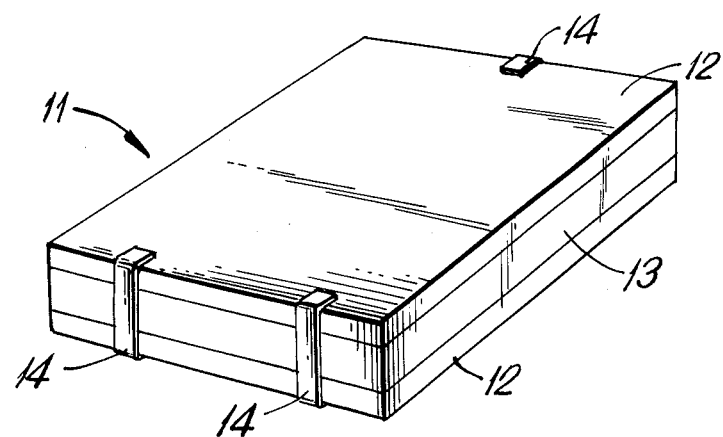
FIG. 1 depicts a form of composite billet in accordance with the invention.

The invention will be described in conjunction with the drawing wherein FIG. 1 depicts a composite billet 11 having outer layers 12 of aluminum and a core 13 of molybdenum. In preparing the billet the surfaces of the molybdenum and aluminum elements are cut to size and carefully cleaned as by pickling, grinding, etc. The plate elements of aluminum and molybdenum are then welded together as by clips 14 which may be made of aluminum. The assembled billet is heated in a protective atmosphere essentially devoid of oxygen at a temperature within the hot working range for aluminum, e.g., about 100° to about 400° C., preferably about 200° to about 300° C. for a time sufficient to through heat the billet and the hot billet is passed through flat rolls (again in a protective atmosphere) to effect a reduction in thickness of about 40% to about 50%, e.g., 45%. Usually bonding is effected in one or two passes. The bonding temperature should be not less than 100° C., to effect bonding and should not exceed about 400° C., because the aluminum becomes too soft. The protective atmosphere for heating the billet is essentially devoid of oxygen and may be argon, helium, nitrogen, hydrogen, a vacuum, etc. The protective atmosphere employed during hot working may be nitrogen. It is to be borne in mind that molybdenum is a readily oxidizable metal and that some oxides of molybdenum are volatile.

The thickness ratio of molybdenum to aluminum in the composite may be in the range of 10% to 90% aluminum to 10% to 90% molybdenum and is established during the bonding step. The thickness ratio does not change materially during subsequent hot or cold reduction to reach the desired thickness.

An example will now be given.

A sandwich type flat billet 15"×25"×0.438" was prepared by assembling two aluminum plates 0.125" thick with a molybdenum plate 0.188" thick sandwiched therebetween. The billet was fastened together using two ⅛"×2"×2" aluminum straps folde over the head end of the billet and welded in place with a single aluminum strap folded over and welded in place over the tail end.

Before assembly, each molybdenum plate was given a caustic and then an acid clean and was pickled in sulfuric-nitric acid. The aluminum plate was mechanically buffed and water rinsed. The assembled billet was heated in hydrogen for 20 minutes in a 200° C. furnace and reduced in successive passes through flat rolls to 0.220" thick, 0.155" thick, then to 0.115/0.120" thick. Bonding essentially was established in the first pass at a reduction of about 50%. The plate was hot sheared to remove ends and edges and a composite plate 14"×30" was recovered which had a aluminum cladding of about 25% on a molybdenum core. About 79% of the weight of the initial billet was recovered as useful product. The hot rolled bonded plate was given a caustic clean and an acid clean and was then cold rolled to 0.050" thick.

Figure 2:
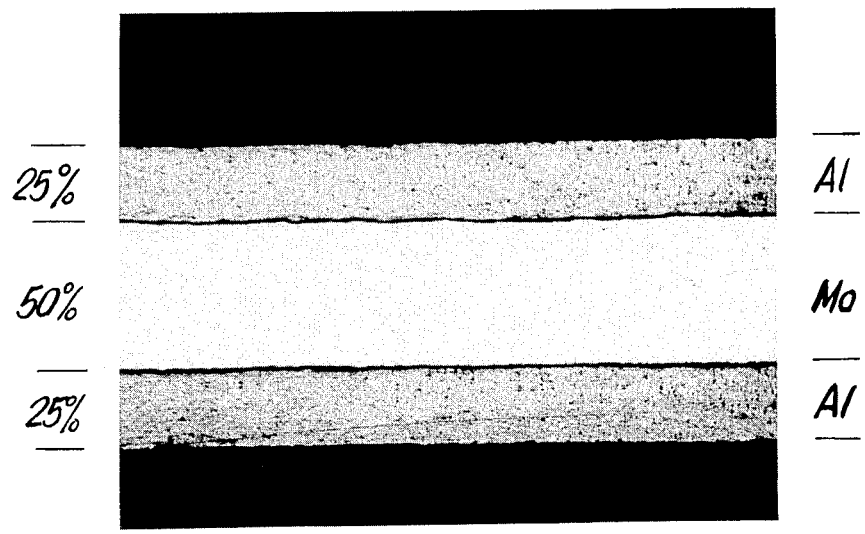
FIG. 2 is a photomicrograph taken at a magnification of 25 diameters showing the bond area between aluminum and molybdenum as produced in accordance with the invention.

FIG. 2 depicts the microstructure of the bond area in the cold rolled sheet thus produced. The interface between molybdenum and aluminum is sharply defined. The interface resists cleavage therealong. No diffusion is detected between the two metals across the interface.

The following table sets forth combinations of properties provided in Al-Mo composite sheet of the invention as a function of aluminum content.

| % Al | T.C.E. ppm° C. | Density Lbs/in$^2$ |
|---|---|---|
| 34 | 5.71 | 0.277 |
| 50 | 6.64 | 0.235 |
| 70 | 11.14 | 0.179 |

While the invention has been illustrated in terms of aluminum-clad molybdenum sheet, composite sheet consisting of aluminum having a molybdenum cladding on one or both faces can also be produced in the same fashion.

Further, while the invention has been illustrated in terms of high pressure roll bonding, the initial composite may be bonded using explosive forming techniques. In the latter case, the precautions in regard to protective atmosphere and bonding temperatures should still be observed. Hot pressing, e.g., hot isostatic pressing or brazing may also be employed for bonding. Cold rolling of the composite may be accomplished using conventional techniques.

The composite material is useful in high performance electronics applications where controlled T.C.E., light weight and heat dissipation are of critical importance. Desired T.C.E. and thermal conductivity can be provided by controlling the aluminum content.

We claim:

1. A roll-bonded composite sheet product having a core layer of molybdenum and layers of aluminum on each face of said molybdenum, with the interface between said molybdenum and said aluminum being sharply defined and with no detectable diffusion occurring across said interface.

2. A roll-bonded composite sheet product having a core layer of aluminum and layers of molybdenum on each face of said aluminum, with the interface between said molybdenum and said aluminum being sharply defined and with no detectable diffusion occurring across said interface.

3. A composite sheet product in accordance with claim 1, having an aluminum thickness of about 10% to about 90%.

4. A package for holding electronic components made from a double clad, roll-bonded composite aluminum-molybdenum sheet having an aluminum thickness of about 10% of about 80% and having a combination of properties including Thermal Coefficient of Expansion, strength, density, conductivity and modulus controlled by controlling the aluminum thickness, with the interface between said molybdenum and said aluminum being sharply defined and with no detectable diffusion occurring across said interface.

* * * * *